(12) United States Patent
Murén et al.

(10) Patent No.: US 7,488,143 B2
(45) Date of Patent: Feb. 10, 2009

(54) TURNING INSERT AND A TURNING TOOL

(75) Inventors: Sture Murén, Gävle (SE); Fredrik Marell, Gëvle (SE)

(73) Assignee: Sandvik Intellectual Property AB, Sandviken (SE)

( * ) Notice: Subject to any disclaimer, the term of this patent is extended or adjusted under 35 U.S.C. 154(b) by 70 days.

(21) Appl. No.: 11/649,364

(22) Filed: Jan. 4, 2007

(65) Prior Publication Data
US 2007/0189861 A1     Aug. 16, 2007

(30) Foreign Application Priority Data
Jan. 10, 2006    (SE) .................................. 0600038

(51) Int. Cl.
*B26D 1/00* (2006.01)
*B26D 7/00* (2006.01)

(52) U.S. Cl. ........................................ 407/113; 407/40

(58) Field of Classification Search ......... 407/101–103, 407/40, 113–116
See application file for complete search history.

(56) References Cited
U.S. PATENT DOCUMENTS
3,963,366 A    6/1976    Eckle et al.

5,032,050 A  *  7/1991  Niebauer et al. ............ 407/114
5,720,583 A  *  2/1998  Bohnet et al. .................. 407/42
5,951,214 A  *  9/1999  Rothballer et al. ............ 407/42

FOREIGN PATENT DOCUMENTS
DE        2 162 682        7/1973

* cited by examiner

*Primary Examiner*—Willmon Fridie
(74) *Attorney, Agent, or Firm*—Drinker Biddle & Reath LLP

(57) ABSTRACT

A turning tool includes an indexable turning insert with a polygonal basic shape. The turning insert includes opposite top and bottom sides, main clearance surfaces that extend between the sides and adjacent to main cutting edges, and a secondary cutting edge that is formed between each pair of main cutting edges and connects to a secondary clearance surface. Pairs of the main cutting edges approach each other in corners defining corner angles of at least 55° and at most 80°. Each of the main and secondary clearance surfaces define respective clearance angles with respect to an imaginary reference plane perpendicular to the top side, and the clearance angle of the secondary clearance surface is at least 1° greater than the clearance angle of the main clearance surface. In such a way, internal turning is provided for exceptionally small holes having diameters in the range of 12 to 6 millimeters.

8 Claims, 4 Drawing Sheets

TURNING INSERT AND A TURNING TOOL

CROSS-REFERENCE TO RELATED APPLICATIONS

This application claims priority under 35 U.S.C. § 119 to Sweden Patent Application No. 0600038-4, filed on Jan. 10, 2006, the disclosure of which is incorporated by reference herein in its entirety.

BACKGROUND OF THE INVENTION

1. Field of the Invention

According to a first aspect, an indexable turning insert has a polygonal basic shape and includes opposite top and bottom sides between which first clearance surfaces extend adjacent to main cutting edges. Pairs of main cutting edges approach each other in corners at angles of at least 55° and at most 80°. Between each pair of main cutting edges there is formed a secondary cutting edge to which a secondary clearance surface connects. The first and second clearance surfaces form clearance angles with respect to an imaginary reference plane disposed perpendicular to the top side of the turning insert.

According to a second aspect, a turning tool includes a turning insert as described above.

2. Description of Related Art

It is known to use turning tools and turning inserts for internal turning that provides a finished surface to pre-drilled holes or pre-formed holes having a diameter of less than 20 millimeters (mm). A related tool for internal turning type machining includes a basic body or boring bar having an insert seat with a turning insert detachably mounted in the insert seat. In order to accomplish internal turning, the insert seat of the related tool is coupled to the basic body so that a radially outermost portion of the turning insert extends beyond an envelope surface defined by the basic body. In order to facilitate chip evacuation when machining small holes, the basic body of the related tool includes a chip flute. The turning insert of the related tool is triangular with clearance surfaces that form a single clearance angle with respect to an imaginary reference plane disposed perpendicular to a top side of the turning insert.

Another related tool includes a turning insert that has a triangular basic shape, opposite top and bottom sides, and clearance surfaces extending between the top and bottom sides. Main clearance surfaces are adjacent to main cutting edges and meet each other in pairs in corners. Formed between each pair of the main cutting edges is a secondary cutting edge to which a secondary clearance surface connects. The main and secondary clearance surfaces again form a single clearance angle with respect to an imaginary reference plane disposed perpendicular to a top side of the turning insert.

These related tools suffer from a number of disadvantages, including that they cannot successfully machine exceptionally small holes, i.e., holes having diameters of 12 mm down to 6 mm. In particular, it is believed that attempting such machining with the related tools results in the clearance surface, which is positioned under the chip-removing tip, scraping against and colliding with the surface just generated. Another disadvantage of the related tools is that it is believed to be impossible to carry out face turning, since there is no chip breaker adjacent to a secondary cutting edge.

BRIEF SUMMARY OF THE INVENTION

Objects of the present invention include obviating the above-mentioned drawbacks and providing an improved turning tool and an improved turning insert. Accordingly, there is provided a turning insert that is suitable for machining of exceptionally small holes. There is also provided a turning insert that allows internal turning as well as face turning. And there is further provided a turning insert that has a size suitable for internal turning and in spite of this having a strong cutting edge.

In an embodiment, there is provided an indexable turning insert having a polygonal basic shape. The turning insert includes opposite top and bottom sides, main clearance surfaces that extend between the top and bottom sides and extend adjacent to main cutting edges, and a secondary cutting edge that is formed between each pair of main cutting edges and connects to a secondary clearance surface. Pairs of the main cutting edges approach each other in corners defining corner angles of at least 55° and at most 80°. Each of the main and secondary clearance surfaces define respective clearance angles with respect to an imaginary reference plane perpendicular to the top side, and the clearance angle of the secondary clearance surface is at least 1° greater than the clearance angle of the main clearance surface.

In another embodiment, there is provided an indexable turning insert that has a polygonal basic shape. The turning insert includes a first side that generally faces opposite a second side, and a clearance surface extends between the first and second sides. The clearance surface includes a plurality of first clearance surfaces that extend adjacent to corresponding main cutting edges defined at least partially by the first side, and a plurality of second clearance surfaces that extend adjacent to corresponding secondary cutting edges defined at least partially by the first side. Each of the first clearance surfaces define a first clearance angle relative to an imaginary reference plane perpendicular to the first side, and each of the second clearance surfaces defines a second clearance angle relative to an imaginary reference plane perpendicular to the first side. Each of the second clearance surfaces is disposed between a corresponding pair of adjacent ones of the first clearances, and each pair of adjacent first clearance surfaces approach one another at a corner angle of approximately 55° to 80°. And the second clearance angle of the secondary clearance surfaces is at least 1° greater than the first clearance angle of the first clearance surfaces.

In a further embodiment, there is provided a turning tool that includes a basic body including an insert seat, and a turning insert that is detachably mounted in the insert seat. The turning insert includes opposite top and bottom sides, main clearance surfaces that extend between the top and bottom sides and extend adjacent to main cutting edges, and a secondary cutting edge that is formed between each pair of main cutting edges and connects to a secondary clearance surface. Pairs of the main cutting edges approach each other in corners defining corner angles of at least 55° and at most 80°. Each of the main and secondary clearance surfaces define respective clearance angles with respect to an imaginary reference plane perpendicular to the top side, and the clearance angle of the secondary clearance surface is at least 1° greater than the clearance angle of the main clearance surface.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

Figure 1:
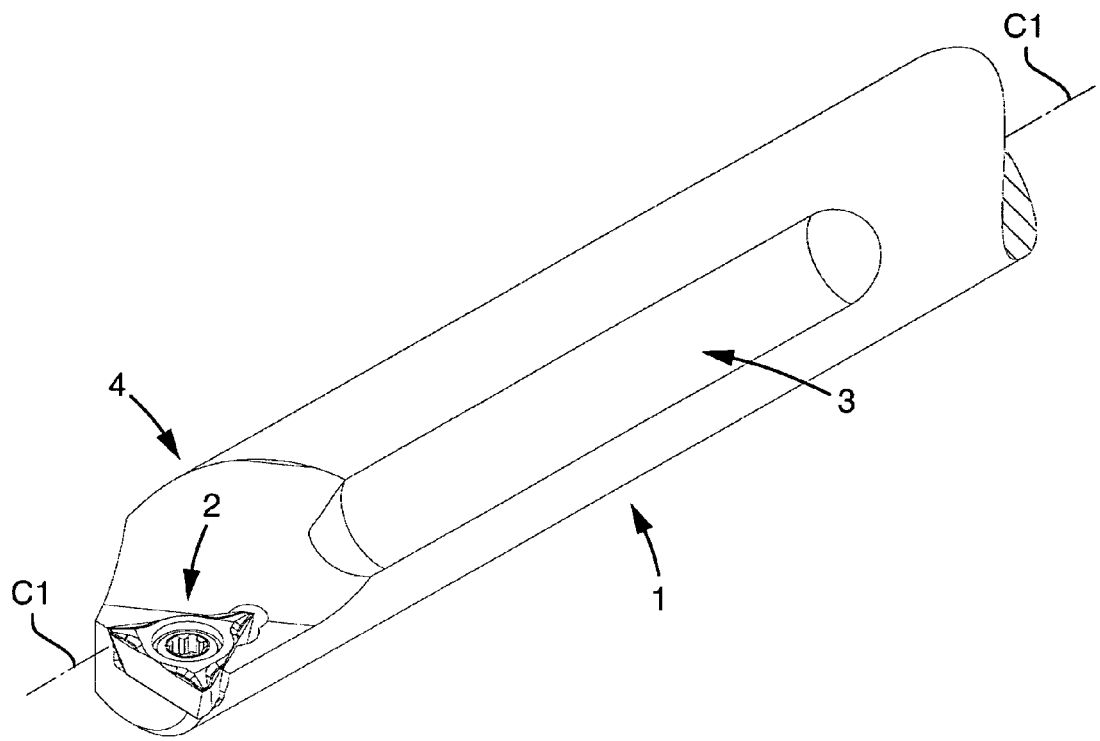
FIG. 1 is a perspective view showing an exemplary embodiment of a turning tool according to the present invention.
Figure 2:
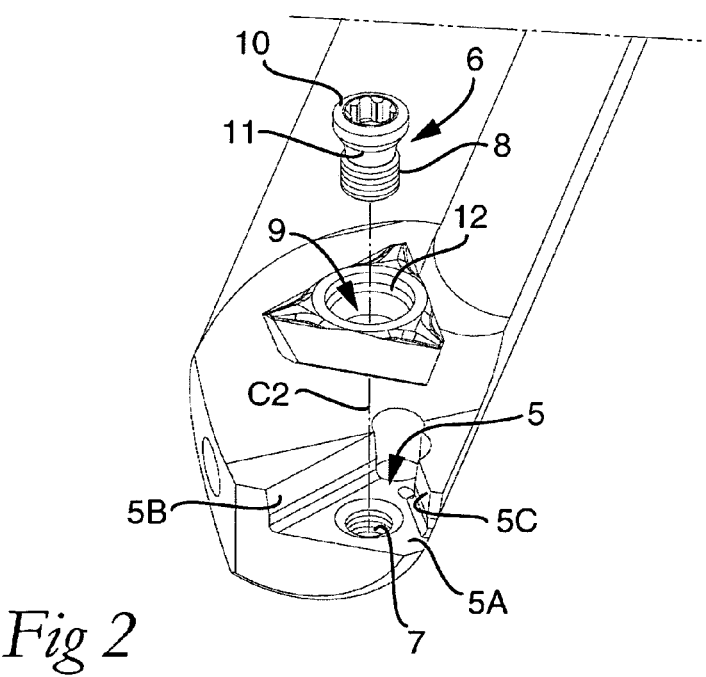
FIG. 2 is an exploded perspective view of the turning tool shown in FIG. 1. Specifically, a turning insert is shown separated from an insert seat of a basic tool body such as a boring bar.
Figure 3:
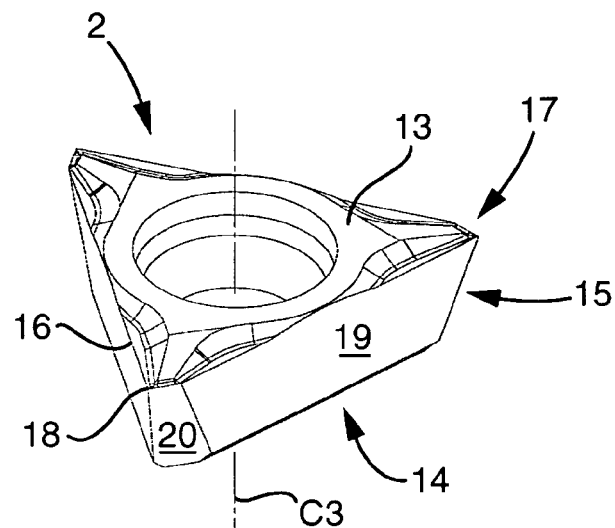
FIG. 3 is a perspective view taken obliquely from above showing a turning insert of the turning tool shown in FIG. 1.
Figure 4:
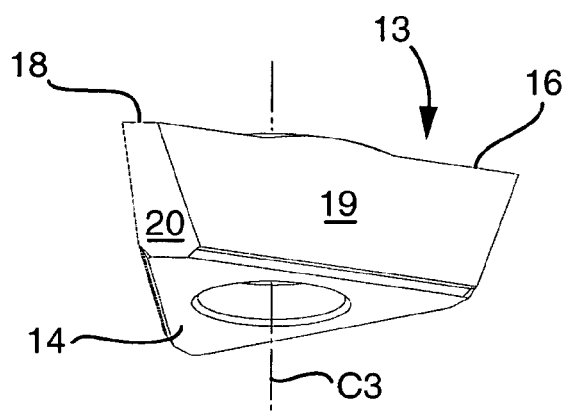
FIG. 4 is a perspective view obliquely from below of the turning insert shown in FIG. 3.
Figure 5:
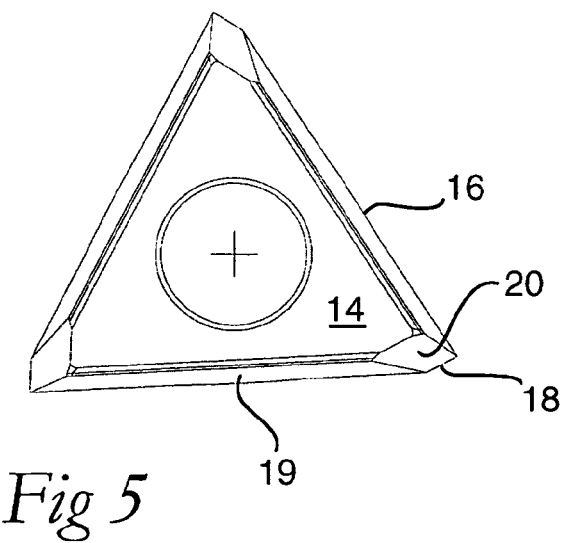
FIG. 5 is a plan view from below of the turning insert shown in FIG. 3.

With reference to FIGS. 1 and 2, an example of a turning tool for metal machining is shown. The turning tool includes a basic body in the form of a boring bar 1 and a replaceable turning insert 2, which is preferably a harder and more wear-resistant material as compared to the boring bar 1. In the example, the tool is intended for finishing the surface of a pre-drilled hole, i.e., internal turning. Preferably, the boring bar 1 may be manufactured from steel and the turning insert 2 may be manufactured from cemented carbide. A rear end of the boring bar 1 is adapted to be mounted in a tool holder (not shown). The boring bar 1 is preferably formed with a chip flute 3 and an insert seat 5 disposed axially in front of the chip flute 3. The insert seat 5 is formed at a front end 4 of the boring bar, and the turning insert 2 is detachably mounted to the insert seat 5. A center axis of the boring bar is designated C1. A clamping member 6, e.g., a screw, fixes the turning insert 2 to the insert seat 5. The turning insert is fixed in the insert seat 5 so as to abut against a bottom surface 5A and against side support surfaces 5B, 5C. A hole 7 is disposed in the bottom surface 5A and is preferably formed with a female thread that cooperatively engages a male thread 8 of the screw 6 for securing the turning insert 2 to the boring bar 1. A center axis of the hole 7 is designated C2. The turning insert 2 is formed with a through hole 9 that receives the clamping member 6. A center axis of the through hole 9 is designated C3 and should coincide with the center axis C2 of the insert seat 5 when the turning insert 2 is secured in the insert seat 5 by the clamping member 6. Preferably, the clamping member 6 includes a head 10 that has a conical, annular contact surface 111 for pressing against a corresponding annular, conical shoulder surface 12 defined by the hole 9.

Referring additionally to FIGS. 3 to 10, an individual turning insert 2 is shown as having a polygonal, e.g., triangular, basic shape. Clearance surfaces, which are generally designated 15, extend between generally planar and parallel top and bottom sides 13, 14. Transitions between the top side 13 and the clearance surfaces 15 define main cutting edges 16. At the three corners generally designated 17 of the turning insert 2, the main cutting edges transform into secondary cutting edges 18. The clearance surfaces 15 include main clearance surfaces 19, which are adjacent to the main cutting edges 16, and secondary clearance surfaces 20, which are adjacent to the secondary cutting edges 18. As is most clearly seen in FIGS. 7 and 8, each of the main and secondary clearance surfaces 19, 20 define clearance angles α and β, respectively, with respect to an imaginary reference planes that extend perpendicular to the top side 13 of the turning insert 2.

Figure 6:
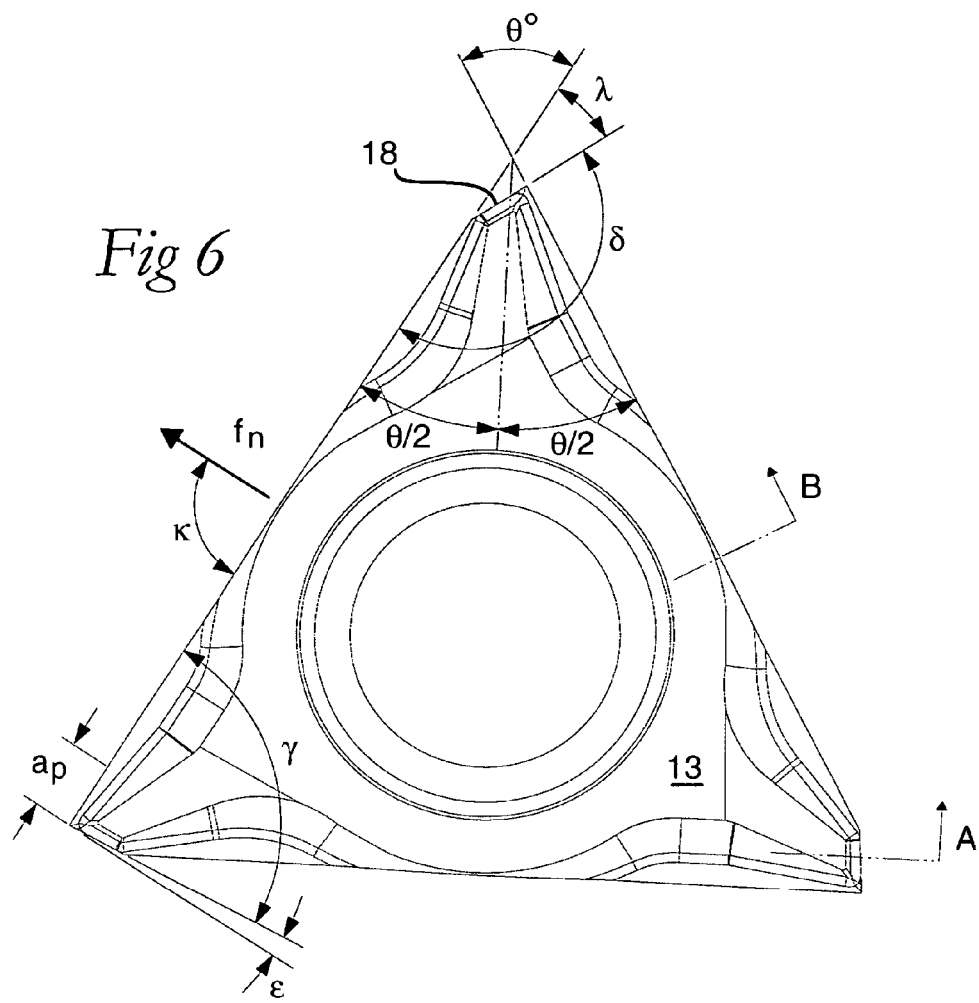
FIG. 6 is a plan view from above of the turning insert shown in FIG. 3.

Preferably, adjacent pairs of the main cutting edges 19 approach each other at a corner angle θ of approximately 60° insofar as the polygonal basic shape of the turning insert 2 is an equilateral triangle. Of courses, turning inserts having different polygonal basic shapes may have pairs of adjacent main cutting edges that approach each other at corner angles of at least approximately 55° and at most approximately 80°. An indexable turning insert that has a corner angle smaller than 55° tends to have an overly elongated shape that, when mounted on a basic body, may not be desirable for space reasons. Regardless of its shape, a turning insert preferably has an inscribed circle (IC) measure no greater than 7 mm. As it is used herein, the IC-measure refers to an established size marking for turning inserts that indicates the largest circle that is accommodated inside the outer borderlines of the turning insert as viewed in plan view. Preferably, the greatest dimension of the turning insert in plan view should not exceed 11 mm. An angle γ between the active main cutting edge and the adjacent secondary cutting edge should be acute and is preferably at least 85°. If the angle γ is too acute, the corner of the turning insert may be undesirably weakened. On the other hand, if the angle γ is obtuse, it may be impossible to achieve a radial as well as an axial clearance. A radial clearance is required in those cases when the hole being machined is not a through hole but the machining needs to go all the way to the bottom of the hole. An angle λ is formed between the secondary cutting edge 18 and an imaginary extension of an inactive main cutting edge 16. According to the relation λ=γ−θ, the angle λ is preferably smaller than 30° and preferably greater than or equal to 25°. An obtuse angle δ is formed between the secondary cutting edge 18 and the inactive main cutting edge 16. According to the relation δ=180−λ, the angle λ is preferably greater than 150° and preferably smaller than or equal to 155°. Referring particularly to FIG. 6, for example, it is the outermost end of the active main cutting edge that generates the machined surface. In other words, an angle ε illustrates the clearance between the secondary cutting edge 18 and the generated surface. Preferably, the angle ε should be at least 1°, and more preferably approximately 5°. The angle ε is determined by a setting angle κ, which the main cutting edge 16 forms with respect to the feeding direction $f_n$, as well as the angle γ. Accordingly, the relationship ε=κ−γ applies. Accordingly, a relatively sharp surface-generating tip is defined at the transition between the active main cutting edge 16 and the secondary cutting edge 18. Preferably, the radius of curvature of the surface generating tip may be smaller than 0.4 mm, and more preferably from 0.1 to 0.2 mm. The small radius is desirable as this produces small radial force loads during machining. It is desirable to avoid excessive radial forces since these may lead to vibrations in the tool.

In previously known turning inserts, the clearance angle at the main cutting edge and at the secondary cutting edge are generally equally large, e.g., approximately 7°.

Figure 7:
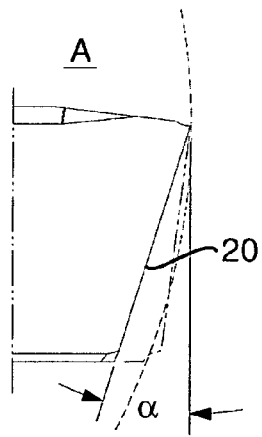
FIG. 7 is a cross section A in FIG. 6.
Figure 8:
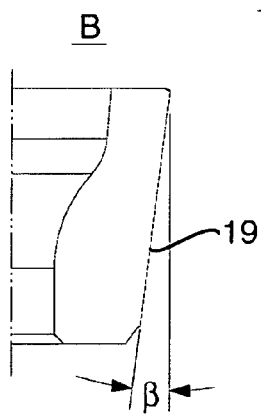
FIG. 8 is a cross section B in FIG. 6.

Now with reference to FIGS. 7 to 11, and to FIG. 7 in particular, the clearance angle α at the secondary clearance surface 20 is considerably greater than 7°. Preferably, the clearance angle α is 11-17°, and more preferably greater than 13°. Accordingly, it is possible to machine smaller holes without any part of the secondary clearance surface 20 contacting the machined material. As shown in FIGS. 7 and 8, clearance is provided between the secondary clearance surface 20 and the machined material when the secondary clearance angle α has been selected in the range of 11-17°. This is in contrast to a case when a smaller secondary clearance angle has been selected (see, for example, the dashed line in FIG. 7), such as an angle corresponding to β (see FIG. 8). The strength of the main cutting edge 16 decreases with an increase in the clearance angle β between the main clearance surface 19 and the imaginary reference plane disposed perpendicular to the top side 13 of the turning insert 2. Therefore, it is not desirable for the angle β to be too large. Preferably, the angle β should not exceed 11°. Preferably, the clearance angle α of the secondary clearance surface 20 is at least 1° greater than the clearance angle β of the main clearance surface 19.

Figure 9:
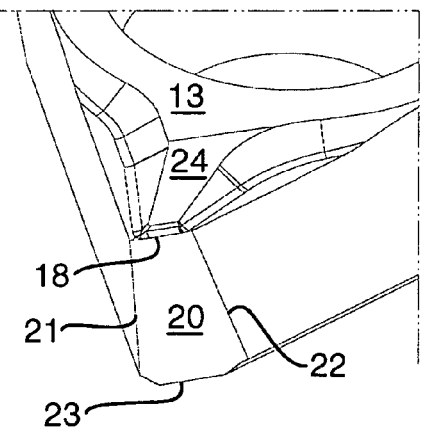
FIG. 9 is an enlarged partial perspective view showing a corner portion of the turning insert shown in FIG. 3.

With reference to FIG. 9, the secondary clearance surface 20 is delimited by a first side borderline 21, a second side borderline 22, a lower borderline 23, as well as by the secondary cutting edge 18. As also shown in FIG. 7, the secondary clearance surface 20 is preferably disposed in an imaginary plane that extends through the lower borderline 23 and the secondary cutting edge 18. Hence, the secondary clearance surface 20 is preferably substantially planar.

The topography of the turning insert 2 and the design of the chip breaker will now be described with particular reference to FIGS. 9 and 10. A land 24 extends from the top side 13 toward the secondary cutting edge 18, and also tapers slightly in a wedge-shape toward the secondary cutting edge 18. The land 24 transforms into a number of ramp surfaces 25A, 25B, 25C that individually transform into respective radius transitions 26A, 26B, 26C. The radius transitions 26A, 26C curve toward the main cutting edges 16 and then transform into respective chip surfaces 27A, 27C, which connect to respective main cutting edges 16. Connecting surfaces that have not been given any reference designation are shown between the ramp surfaces 25A, 25C and the ramp surface 25B. There are also connecting surfaces between the radius transitions 26A, 26C and the radius transition 25B.

Figure 10:
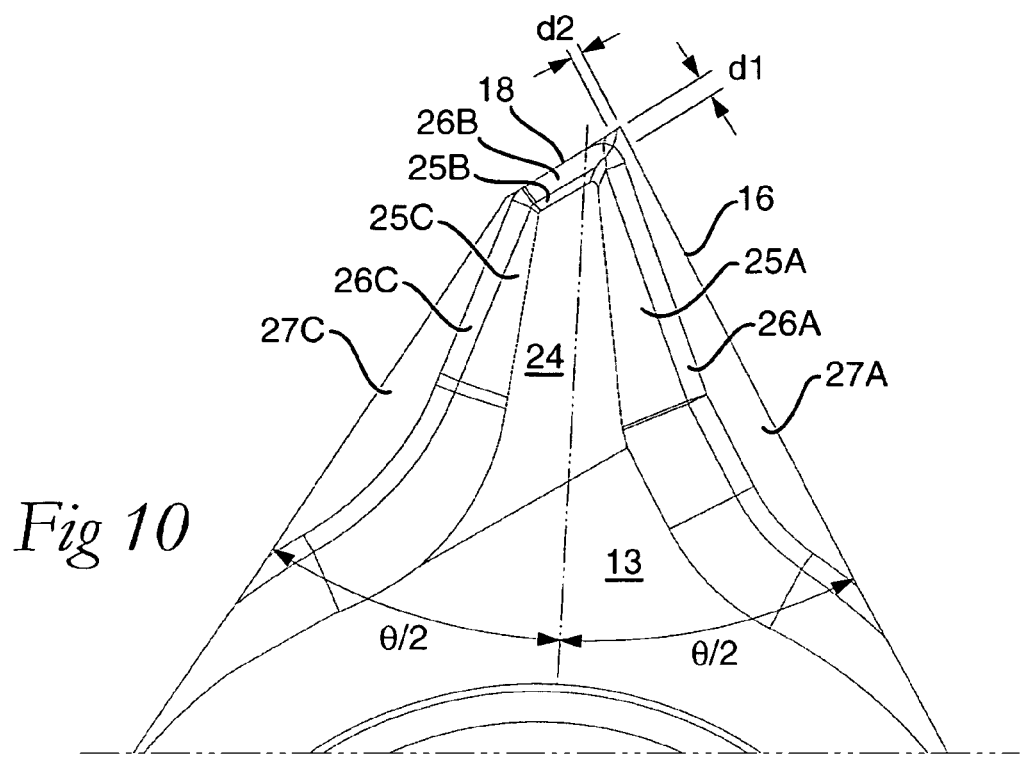
FIG. 10 is a very enlarged plan view of a corner portion of the turning insert shown in FIG. 3.

As particularly shown in FIG. 10, the inner borderlines of the chip surfaces 27A, 27C are preferably arched. Accordingly, the corresponding ramp surfaces 25A, 25C and the connecting radius transitions 26A, 26C also preferably include an arched configuration. The radius transition 26B, which extends toward the secondary cutting edge 18, does not transform into any chip surface but connects directly to the secondary cutting edge 18. If by definition it is assumed that a chip breaker, as viewed in the direction from a cutting edge, starts with a radius transition, then the chip breaker is seen extending all the way up to the secondary cutting edge 18. A distance d1 between the secondary cutting edge 18 and the transition between the radius transition 26B and the ramp surface 25B is preferably no greater than 0.1 mm, and more preferably 0.02-0.05 mm. This allows machining at small cutting depths without the chip "flowing over" the turning insert, i.e., passes without chip breaking. In addition to longitudinal turning for internal turning, the radius transition 26B and the ramp surface 25B adjacent to the secondary cutting edge 18 also makes possible face turning, e.g., at an end surface surrounding a hole. The feed direction during face turning is substantially perpendicular to the feed direction during cylindrical internal turning. The turning insert is preferably intended for relatively small feed insofar as the chip surface 27A adjacent to the active main cutting edge 16 is relatively slender. The smallest distance d2 between the active main cutting edge 16 and the transition between the chip surface 27A and the radius transition 26A is preferably no greater than 0.1 mm, and more preferably 0.02-0.05 mm.

With reference to FIG. 10, a bisector of the corner angle θ is indicated with a chain line. By virtue of the design and position of the chip breaker, the bisector intersects the secondary cutting edge 18, the radius transition 26B, the ramp surface 25B, and the land 24. In contrast to the related tools described above, the bisector does not intersect the chip surface 27A of the active main cutting edge 16.

Figure 11:
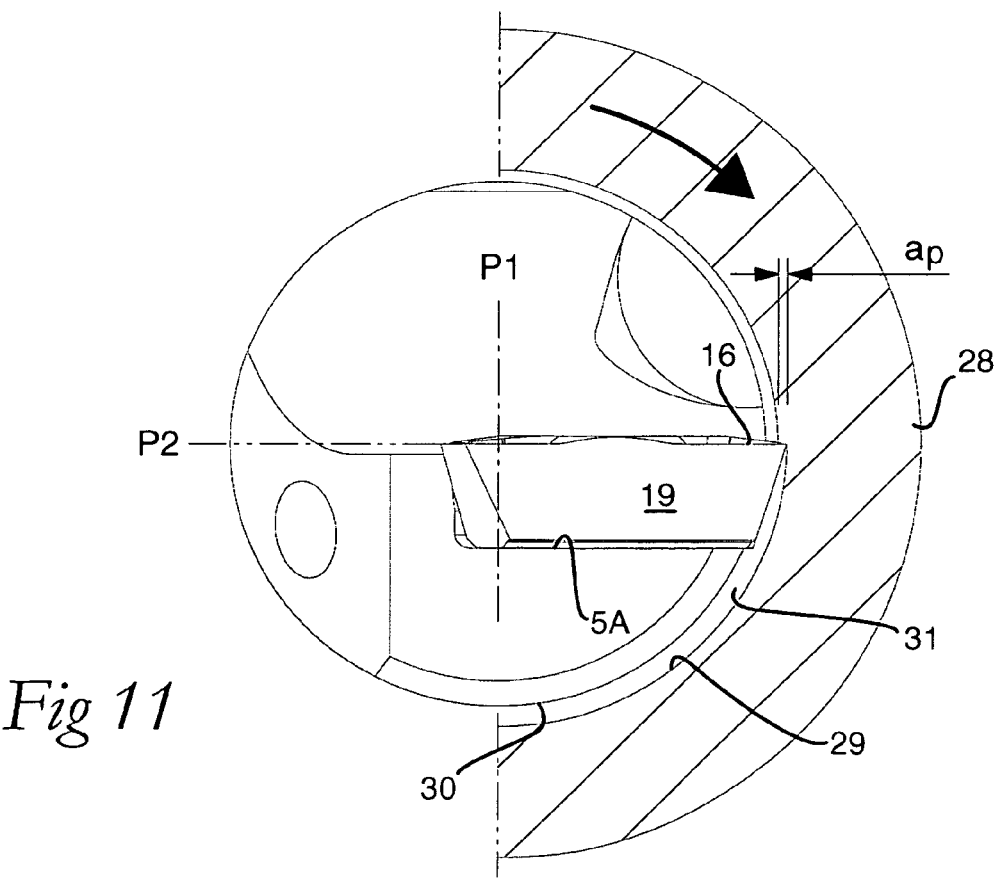
FIG. 11 is a schematic illustration illustrating the turning tool shown in FIG. 1 machining a hole.

Now with reference to FIG. 1, a complete turning tool is shown together with a workpiece 28. It is shown that the workpiece 28 rotates and the tool is fixedly anchored such that the tool is intended to turn a hole having an absolutely minimal diameter in relation to the diameter of the boring bar. For example, the completed hole may have a diameter in the range of 6-12 mm, with the corresponding diameter of the boring bar approximately 5-10 mm, such that a cutting depth $a_p$ is in the range of approximately one-tenth of a millimetre. Preferably, the cutting depth $a_p$ is in the range of 0.05-0.5 mm, and more preferably approximately 0.1-0.3 mm. Accordingly, a hole surface 29 is generated that is separated from the envelope surface 30 of the boring bar by an annular gap 31, the width of which is approximately 1 mm or less. Preceding the engagement of the main cutting edge 16 with the workpiece 28, the gap is even more slender. FIG. 11 shows first and second reference planes P1, P2 that are mutually perpendicular and intersect each other along the center axis C1. The second reference plane P2 is substantially parallel to the bottom surface 5A of the insert seat 5. Upon machining, the surface-generating portion of the turning insert 2 should be situated at a point where the tangent of the machined hole is parallel to the first reference plane P1. Additionally, the cutting depth $a_p$ is preferably no greater than 0.3 mm for boring bars having a diameter between 5 and 6 mm, and preferably no greater than 0.5 mm for boring bars having a diameter between 8 and 10 mm. According to the design of the turning insert 2, it is possible to machine holes having an original diameter that exceeds the diameter of the boring bar by less than 1 mm, and to machine holes with a boring bar that has a diameter of 5 mm or less.

Preferably, the clearance surfaces and the edges of the turning insert are manufactured by grinding. However, it is also feasible to produce the turning insert by alternate manufacturing methods, e.g., by direct pressing.

The embodiments that are described above and illustrated in the drawings are merely exemplary, and many variations are envisioned. For example, the turning insert and the tool are exemplified in the form of a right hand insert fixed in a left hand boring bar in order to form a turning tool. However, it is also envisioned that left hand inserts may be used with right hand boring bars.

According to the exemplified embodiments of the turning insert, the secondary clearance surface is in an imaginary plane that extends through the lower borderline and the secondary cutting edge such that the secondary clearance surface is planar. It is also envisioned that the secondary clearance surface may have alternate configurations. For example, between the lower borderline and the secondary cutting edge, the secondary clearance surface may be at least partially defined by a convex surface. In such a case, the clearance angle is defined by the angle that is formed between the imaginary reference plane that is perpendicular to the top side of the turning insert and a second imaginary reference plane that extends through the secondary cutting edge and the lower borderline. It is also envisioned that the secondary clearance surface may transform into a subjacent secondary clearance part surface having a clearance angle that is greater than the secondary clearance angle, still with respect to the imaginary reference plane.

It is also envisioned that the secondary cutting edge may have a convex shape in plan view. Accordingly, the secondary clearance surface may also at least partly have a convex shape between the first side borderline and the second side borderline.

It is also envisioned that the transition between the main cutting edge and the secondary cutting edge may be made either with a small radius, as discussed above, or formed with a considerably greater radius in order to achieve a less sharp tip.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. An indexable turning insert having a polygonal basic shape, the turning insert comprising:
    opposite top and bottom sides;
    main clearance surfaces extending between the top and bottom sides and extending adjacent to main cutting edges, pairs of the main cutting edges approaching each other in corners defining corner angles of at least 55° and at most 80°; and
    a secondary cutting edge being formed between each pair of main cutting edges and connecting to a secondary clearance surface;
    wherein each of the main and secondary clearance surfaces define respective clearance angles with respect to an imaginary reference plane perpendicular to the top side, and the clearance angle of the secondary clearance surface is at least 1° greater than the clearance angle of the main clearance surface.

2. Turning insert according to claim 1, wherein the clearance angle of the secondary clearance surface is at least 11°.

3. An indexable turning insert having a polygonal basic shape, the turning insert comprising:
    opposite top and bottom sides;
    main clearance surfaces extending between the top and bottom sides and extending adjacent to main cutting edges, pairs of the main cutting edges approaching each other in corners defining corner angles of at least 55° and at most 80°; and
    a secondary cutting edge being formed between each pair of main cutting edges and connecting to a secondary clearance surface;
    wherein each of the main and secondary clearance surfaces define respective clearance angles with respect to an imaginary reference plane perpendicular to the top side, and the clearance angle of the secondary clearance surface is at least 1° greater than the clearance angle of the main clearance surface;
    wherein a radius transition transforms into a ramp surface and connects to the secondary cutting edge; and
    wherein a distance between the secondary cutting edge and the transformation of the radius transition into the ramp surface is not greater than approximately 0.1 mm.

4. Turning insert according to claim 1, further comprising:
    an angle between an active main cutting edge and the secondary cutting edge is acute and at least 85°.

5. An indexable turning insert having a polygonal basic shape, the turning insert comprising:
    opposite top and bottom sides;
    main clearance surfaces extending between the top and bottom sides and extending adjacent to main cutting edges, pairs of the main cutting edges approaching each other in corners defining corner angles of at least 55° and at most 80°; and
    a secondary cutting edge being formed between each pair of main cutting edges and connecting to a secondary clearance surface;
    wherein each of the main and secondary clearance surfaces define respective clearance angles with respect to an imaginary reference plane perpendicular to the top side, and the clearance angle of the secondary clearance surface is at least 1° greater than the clearance angle of the main clearance surface; and
    wherein an inscribed circle measure of the turning insert is no greater than 7 mm.

6. Turning insert according to claim 1, wherein the secondary clearance surface is delimited by a first side borderline, a second side borderline, a lower borderline and the secondary cutting edge, and that the secondary clearance surface defines an imaginary plane extending through the lower borderline and the secondary cutting edge.

7. An indexable turning insert having a polygonal basic shape, the turning insert comprising:
    a first side generally facing opposite a second side;
    a clearance surface extending between the first and second sides, the clearance surface including:
        a plurality of first clearance surfaces extending adjacent to corresponding main cutting edges defined at least partially by the first side, each of the first clearance surfaces defining a first clearance angle relative to an imaginary reference plane perpendicular to the first side; and
        a plurality of second clearance surfaces extending adjacent to corresponding secondary cutting edges defined at least partially by the first side, each of the second clearance surfaces defining a second clearance angle relative to an imaginary reference plane perpendicular to the first side;
    wherein each of the second clearance surfaces is disposed between a corresponding pair of adjacent ones of the first clearance surfaces, and each pair of adjacent first clearance surfaces approach one another at a corner angle of approximately 55° to 80°; and
    wherein the second clearance angle of the secondary clearance surfaces is at least 1° greater than the first clearance angle of the first clearance surfaces.

8. A turning tool comprising:
    a basic body including an insert seat; and
    a turning insert being detachably mounted in the insert seat, the turning insert including:
        opposite top and bottom sides;
        main clearance surfaces extending between the top and bottom sides and extending adjacent to main cutting edges, pairs of the main cutting edges approaching each other in corners defining corner angles of at least 55° and at most 80°; and
        a secondary cutting edge being formed between each pair of main cutting edges and connecting to a secondary clearance surface;
        wherein each of the main and secondary clearance surfaces define respective clearance angles with respect to an imaginary reference plane perpendicular to the top side, and the clearance angle of the secondary clearance surface is at least 1° greater than the clearance angle of the main clearance surface.

* * * * *